(12) United States Patent
Conner et al.

(10) Patent No.: US 7,196,687 B2
(45) Date of Patent: Mar. 27, 2007

(54) SWEPT ILLUMINATION TO REDUCE LCD LAG IN FRONT AND REAR PROJECTION DISPLAYS

(75) Inventors: Arlie R. Conner, Portland, OR (US); Frederic R. Engstrom, Hillsboro, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 470 days.

(21) Appl. No.: 10/699,957

(22) Filed: Nov. 3, 2003

(65) Prior Publication Data

US 2004/0135754 A1    Jul. 15, 2004

Related U.S. Application Data

(60) Provisional application No. 60/423,827, filed on Nov. 5, 2002.

(51) Int. Cl.
*G09G 3/36* (2006.01)
(52) U.S. Cl. .............. 345/102; 345/213; 348/744; 348/761; 348/781; 348/782
(58) Field of Classification Search ............... 345/87, 345/102, 213; 348/744, 761, 781–782
See application file for complete search history.

(56) References Cited

U.S. PATENT DOCUMENTS

| 5,121,233 | A | 6/1992 | Spencer et al. |
|---|---|---|---|
| 5,398,082 | A | 3/1995 | Henderson et al. |
| 5,416,514 | A * | 5/1995 | Janssen et al. ............. 348/196 |
| 5,479,187 | A | 12/1995 | Chen |
| 5,548,347 | A | 8/1996 | Melnik et al. |
| 5,592,193 | A | 1/1997 | Chen |
| 5,625,738 | A | 4/1997 | Magarill |
| 6,636,190 | B2 | 10/2003 | Hirakata et al. |
| 2002/0036608 | A1 | 3/2002 | Hirakata et al. |
| 2004/0056983 | A1* | 3/2004 | Dean .......................... 348/679 |
| 2004/0080718 | A1* | 4/2004 | Kojima ........................ 353/55 |

FOREIGN PATENT DOCUMENTS

WO    WO 94/09475    4/1994

OTHER PUBLICATIONS

Furuhashi, et al., "High Quality TFT-LCD System for Moving Picture," *SID 02 Digest*, Paper 48.3, pp. 1284-1287, May 2002.

(Continued)

*Primary Examiner*—Amr A. Awad
*Assistant Examiner*—Michael Pervan
(74) *Attorney, Agent, or Firm*—George W. Jonas

(57) ABSTRACT

Methods for illuminating the display area of a liquid crystal panel (13) are provided. Illumination light (17) is compressed into a stripe which is scanned across the display area in synchronization with the display's refresh cycle. In particular, the scanning is performed so that for each row of the display, the majority of the illumination light which impinges on the row as a result of the scan is in the last half of the cycle fresh period for the row. In this way, the ability to display moving objects is improved.

19 Claims, 4 Drawing Sheets

OTHER PUBLICATIONS

Fisekovic, et al., "Scanning Backlight Parameters for Achieving the Best Picture Quality in AM LCD," Eurodisplay 2002, Paper P-41, pp. 533-536, 2002.

Shimizu, J. A., "Scrolling Color LCOS for HDTV Rear Projection," *SID 01 Digest*, Paper 40.1, pp. 1072-1075, 2001.

Brennesholtz, M. S. "Color-Sequential LcoS Projector with a Rotating Drum," *SID 02 Digest*, Paper 51.4, pp. 1346-1349, 2002.

Janssen, p. "A novel single light valve high brightness HD color projector," Eurodisplay 1993, Paper LCP-1, pp. 249-252, 1993.

* cited by examiner

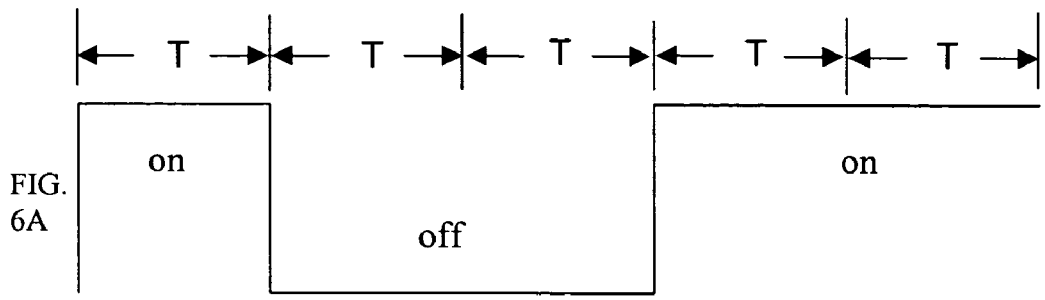
FIG. 6A
FIG. 6B
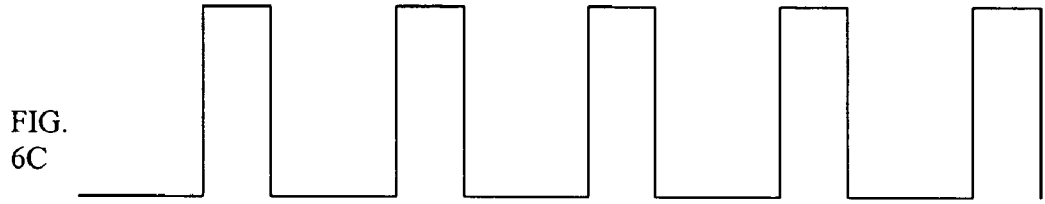
FIG. 6C
FIG. 6D
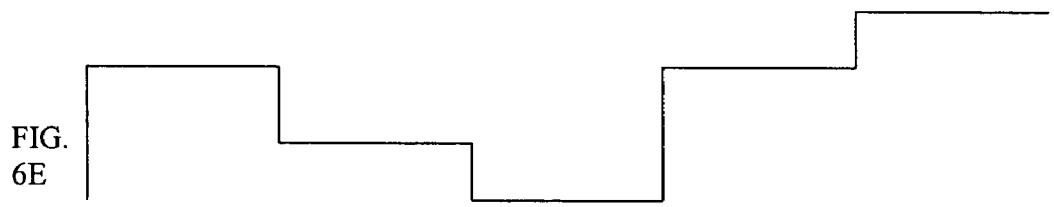
FIG. 6E
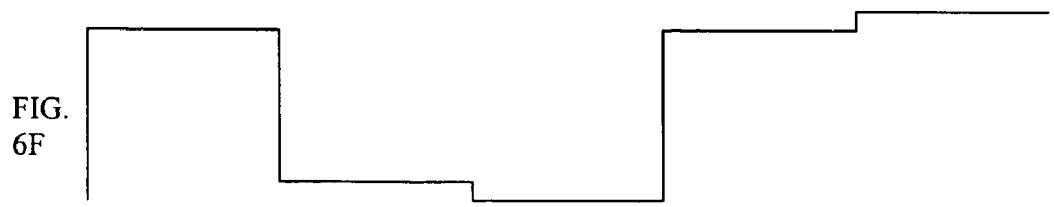
FIG. 6F

SWEPT ILLUMINATION TO REDUCE LCD LAG IN FRONT AND REAR PROJECTION DISPLAYS

CROSS REFERENCE TO RELATED PROVISIONAL APPLICATION

This application claims the benefit under 35 USC §119(e) of U.S. Provisional Application No. 60/423,827, filed Nov. 5, 2002, the contents of which are incorporated herein in their entirety.

FIELD OF THE INVENTION

This invention relates to a method for scanning illumination light across the display area of a liquid crystal display panel so as to (1) improve the ability of such a panel to display motion and (2) accommodate the lag which liquid crystal materials exhibit in changing state.

BACKGROUND OF THE INVENTION

For liquid crystal panels, there is a known problem with displaying motion due to the active matrix pixel element "holding" the charge for the entire frame, and therefore not responding with an impulse like a CRT. See, for example, U.S. Pat. No. 6,636,190, which was published on Mar. 28, 2002 as U.S. Patent Application Publication No. U.S. 2002/0036608, Furuhashi, et al., "High Quality TFT-LCD System for Moving Picture," *SID 02 Digest*, Paper 48.3, pp. 1284–1287, May 2002, and Fisekovic, et al., "Scanning Backlight Parameters for Achieving the Best Picture Quality in AM LCD," Eurodisplay 2002, Paper P-41, pp. 533–535, 2002. This is especially a problem with sports imagery, where, for example, a golf ball can appear blurred or even missing.

There are several proposed solutions to this problem, including overdriving and insertion of a "black frame," which decreases brightness.

The present invention addresses the problem of displaying motion in projection displays employing liquid crystal panels (e.g., rear or front projection TVs or monitors) and provides a clearer picture whenever there is motion while, in its preferred embodiments, retaining brightness.

SUMMARY OF THE INVENTION

In broadest concept, the invention involves scanning the illumination of a projection display in coordination with the refreshing of the information being displayed. More particularly, the illumination is compressed into a stripe and then the stripe is swept across the frame (top to bottom typically) in synchronism with the updating of the image on the LCD, i.e., in synchronism with the frame refresh.

Preferably, such scanning is done without loss of brightness by providing the compressed illumination with the appropriate illuminance. Consider, for example, illuminating a one-third stripe of the display and then sweeping that portion across the entire display surface. If this area has the same total brightness as the display would have had if illuminated over its entire area, brightness will be conserved. In particular, for a one-third stripe, the stripe preferably has three times the illuminance it would have had if the entire display had been illuminated. Corresponding illuminance levels for strips having different dimensions are similarly determined, e.g., a one-fourth stripe preferably has four times the illuminance it would have had if the entire display had been illuminated. Sweeping of such a high illuminance stripe over the display conserves brightness.

By illuminating areas of the display for defined time periods, each line of the display can have light during the optimum time period when the display reaches its maximum or minimum intensity, thus increasing the display fidelity. By adding periods of darkness and compressing the time particular pixels or rows of pixels produce output light, the perceived effects of liquid crystal lag are reduced or eliminated.

Some of the lag exhibited by liquid crystal displays is due to slow liquid crystal motion, but at least part of the lag is due to the sample-hold function of the pixel elements and part of the lag can be attributed to the human eye. By "pulsing" the light for any particular pixel, row, or group of rows the liquid crystal (LC) can be made to appear faster, and more like a CRT with a refreshed flying-spot, which has an impulse response instead of a held response.

A faster responding LC and/or an increased frame rate can further aid in removing or completely eliminating lag. But at least partial reduction can occur even with slow response display materials and the typical 60 Hz refresh rate.

The invention thus provides a method and associated apparatus for illuminating a liquid crystal panel which has a display area and comprises a plurality of rows which are sequentially addressed during a frame refresh cycle, said frame refresh cycle having a period T and each of the plurality of rows having a predetermined refresh time within the frame refresh cycle with the period of time between successive refresh times for each row (the cycle refresh period of the row) being equal to T, said method comprising:

(a) providing illumination light (typically white light) from a light source;

(b) compressing the illumination light into a stripe which has an area smaller than the display area, said stripe being parallel to the plurality of rows (e.g., an area such that the ratio R of the stripe area to the display area is less than or equal to one third);

(c) using a moving optical element (e.g., a moving cylindrical lens or a rotating prism) to cause the stripe of illumination light to scan over the display area in a direction perpendicular to the plurality of rows, said direction corresponding to the direction in which the plurality of rows are sequentially addressed during a frame refresh cycle; and (d) synchronizing the scanning of the stripe of illumination light with the frame refresh cycle so that for each row of the display, the majority of the illumination light which impinges on the row as a result of the scan is in the last half (or, alternatively, the last third) of the cycle refresh period for the row.

It should be noted that the foregoing method for illuminating a display panel is different from scrolling color systems where synchronization is with changes in the color of the illumination, not with the refresh cycle of the display. Examples of the use of scrolling color in connection with single panel LCoS systems can be found in: Shimizu, J. A., "Scrolling Color LCOS for HDTV Rear Projection," *SID 01 Digest*, Paper 40.1, pp. 1072–1075, 2001; Brennesholtz, M. S. "Color-Sequential LCoS Projector with a Rotating Drum," *SID 02 Digest*, Paper 51.4, pp. 1346–1349, 2002; Janssen, P. "A novel single light valve high brightness HD color projector," Eurodisplay 1993, Paper LCP-1, pp. 249–256, 1993; and U.S. Pat. No. 5,548,347.

In this way, the problems associated with displaying motion and the problems associated with changing the state of a liquid crystal material are addressed. The problem of reduced brightness is also addressed when the light source/ compression system combination produces a stripe whose brightness is approximately 1/R times the brightness which would be produced if the entire display were illuminated, where R, as defined above, is less than 1.0.

Another embodiment of the invention is method for illuminating a display panel which has a display area and comprises a plurality of rows which are sequentially addressed during a frame refresh cycle. The frame refresh cycle has a period T and each of the plurality of rows has a predetermined refresh time within the frame refresh cycle with the period of time between successive refresh times for each row being the cycle refresh period for the row and being equal to T. The method includes (a) providing illumination light from a light source;

(b) compressing the illumination light into a stripe which has an area smaller than the display area, said stripe being parallel to the plurality of rows;

(c) sequentially scanning the stripe of illumination light over each of the plurality of rows during the frame refresh cycle; and (d) synchronizing the scanning of the stripe of illumination light with the frame refresh cycle so that for each row of the display, the majority of the illumination light which impinges on that row as a result of the scan is in the last half of the cycle refresh period for that row.

Yet another embodiment of the invention is a display which includes a light source, a display panel, a movable optical element, and a processor. The display panel includes a display area and a plurality of rows. The movable optical element is capable of compressing light from the light source into a stripe of illumination light that has an area smaller than the display area. The processor is configured and arranged to sequentially address each of the plurality of rows of the display panel during a frame refresh cycle to display an image, where the frame refresh cycle has a period T and each of the plurality of rows has a predetermined refresh time within the frame refresh cycle with the period of time between successive refresh times for each row being the cycle refresh period for the row and being equal to T. The processor is also configured and arranged to move the optical element to scan the stripe of illumination light sequentially over each of the plurality of rows in a synchronized manner so that the majority of the illumination light impinges on each row during the last half of the cycle refresh period for that row. The processor optionally includes two or more subprocessors.

Additional features of the invention are set forth in the description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that both the foregoing general description and the following more detailed description are merely exemplary of the invention and are intended to provide an overview or framework for understanding the nature and character of the invention.

BRIEF DESCRIPTION OF THE DRAWINGS

FIG. 2 illustrates the use of a moving cylindrical lens to achieve sweeping, while FIG. 3 illustrates the use of a rotating prism for the same purpose.

FIGS. 5 and 6 are schematic drawings illustrating the temporal relationship between the scanning of illumination light and the refresh cycle for a panel in accordance with the invention. In particular, FIGS. 5A (5D) shows the liquid crystal (LC) drive signal for a representative top (middle) row of the display, FIGS. 5B (5E) shows the LC optical response of said representative top (middle) row, and FIGS. 5C (5F) illustrates representative timing of the illumination of said top (middle) row in accordance with the invention. FIGS. 6A, 6B, and 6C repeat FIGS. 5A, 5B, and 5C, respectively, and FIG. 6D shows intended brightness, FIG. 6E shows actual average perceived brightness with the static illumination approach of the prior art, and FIG. 6F shows actual average perceived brightness with the swept illumination technique of the invention.

DESCRIPTION OF THE INVENTION

Figure 1:
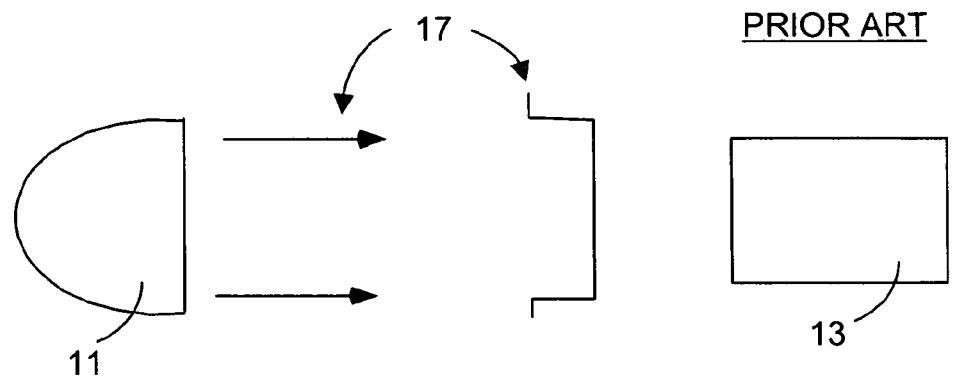
FIG. 1 is a schematic illustration of a prior art illumination system.
Figure 2:
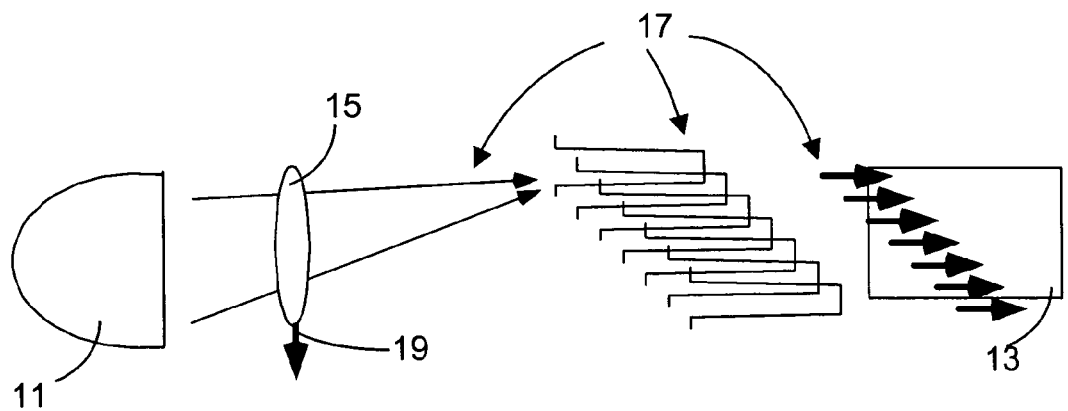
FIGS. 2 and 3 are schematic illustrations of representative apparatus for practicing the illumination method of the invention. In particular.
Figure 3:
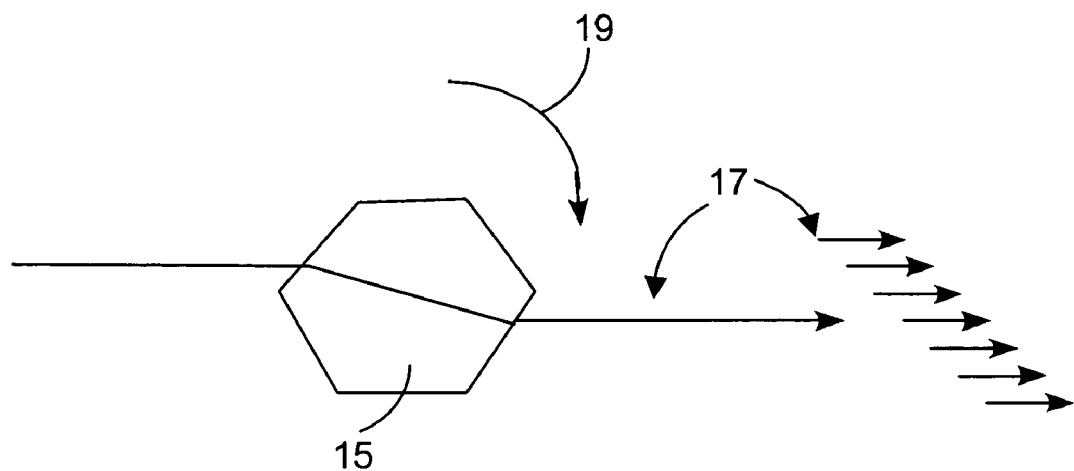
Figure 4:
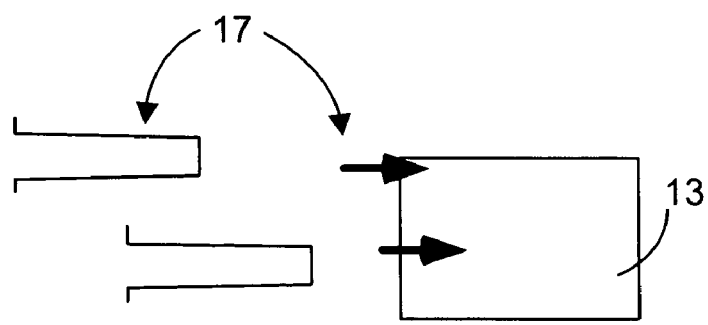
FIG. 4 is a schematic drawing illustrating illumination light impinging on a representative top row and a representative middle row of the display area of a pixelized panel.

The invention is illustrated in the attached figures, where:

(a) FIG. 1 shows the prior art static illumination approach;

(b) FIG. 2 illustrates the swept illumination approach wherein a stripe is created by, in this case, a cylindrical lens which is moved vertically causing the stripe to be "swept" across the display surface (see U.S. Pat. No. 5,398,082 for a discussion of the use of moving optical systems, including refractive and reflective systems, to sweep illumination);

(c) FIG. 3 illustrates the use of a rotating prism to create the desired sweeping (see U.S. Pat. No. 5,548,347 and the Shimizu, Brennesholtz, and Janssen articles referred to above for discussions of the use of rotating prisms to sweep illumination); and (d) FIGS. 4–6 illustrate how brightness and/or accuracy of the display can be enhanced by illuminating a pixel (or row or group of rows) in coordination with its having attained its full on or off values, i.e., by coordinating the illumination stripe with the refresh cycle.

In these figures, the reference number 11 refers to the projector's light source (lamp), 13 refers to a pixelized panel, 15 refers to a moving optical element, 17 refers to illumination light, and arrows 19 illustrate movement of moving optical element 15. Although not shown in these figures, relay optics and a light homogenizer are used between light source 11 and panel 13. See, for example, Magarill, U.S. Pat. No. 5,625,738. The figures also do not show the projection lens which is used to project the image formed on the panel onto a rear or front projection screen. Although only one panel is shown in the figures, multiple panels can be used if desired.

As illustrated in these figures, the process of this invention comprises:

(a) compressing the illumination light into a display area smaller than the entire display, e.g., create stripe illumination, (b) using a moving optical element to cause the smaller area (e.g., stripe illumination) to scan or sweep over (e.g., down) the surface of the display device, and (c) synchronizing the sweep to the display updating/refreshing (typically a row-at-a-time), i.e., scanning the illumination in synch with the display refresh.

In particular, FIG. 5 illustrates how illumination pulses can be synchronized with the driving (refreshing) of representative top and middle rows of a display, while FIG. 6 shows how such synchronization improves the image provided to the viewer by the representative top row of FIG. 5. Similar improvements apply to the representative middle row of FIG. 5, as well as to all other rows (or groups of rows) of the display as a result of the synchronization of the illumination with the refresh cycle.

Figure 5A:
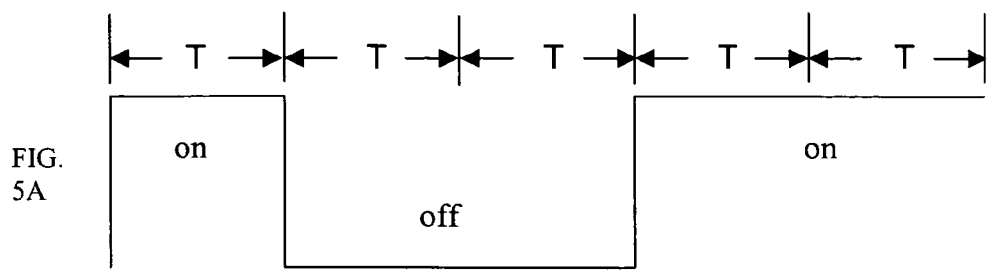
Figure 5B:
Figure 5C:
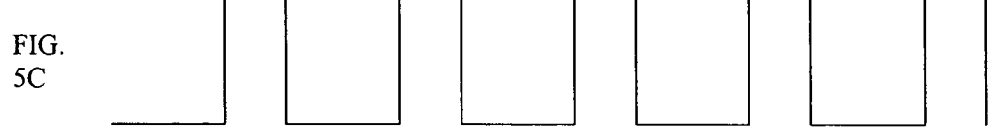
Figure 5D:
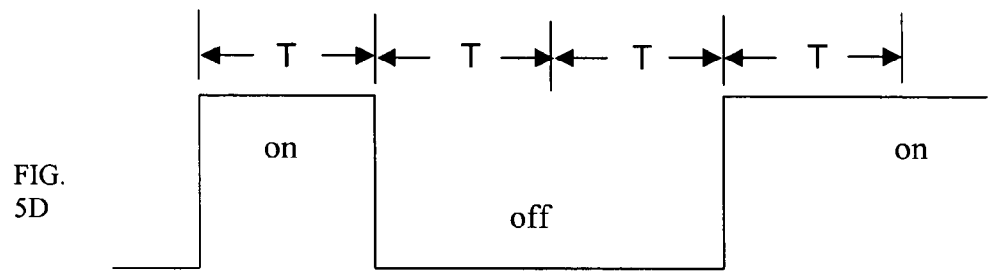
Figure 5E:
Figure 5F:
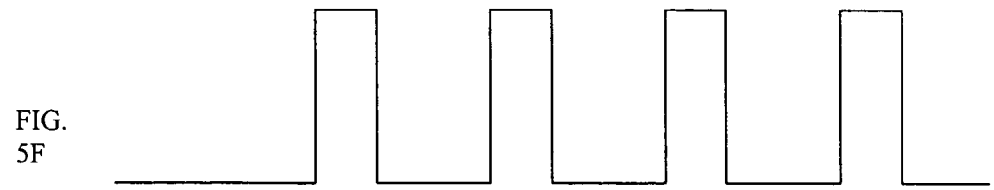

As illustrated in, for example, FIGS. 5A/5C and FIGS. 5D/5F, for each row, the majority of the illumination light which impinges on the row as a result of the scanning of the illumination light is in the last half (e.g., the last third) of the cycle refresh period T for the row. As illustrated in FIGS. 6D, 6E, and 6F, by this coordination of the scanning (sweeping) of the illumination light with the refresh cycle, the actual average perceived brightness of the invention (FIG. 6F) is closer to the intended brightness (FIG. 6D) than with static illumination (FIG. 6E).

Although specific embodiments of the invention have been described and illustrated, it is to be understood that a variety of modifications which do not depart from the scope and spirit of the invention will be evident to persons of ordinary skill in the art from the foregoing disclosure. The contents of the various patent and literature references referred to above are incorporated herein by reference.

What is claimed is:

1. A method for illuminating a liquid crystal panel which has a display area and comprises a plurality of rows which are sequentially addressed during a frame refresh cycle, said frame refresh cycle having a period T and each of the plurality of rows having a predetermined refresh time within the frame refresh cycle with the period of time between successive refresh times for each row being equal to T, said method comprising:
   (a) providing illumination light from a light source;
   (b) compressing the illumination light into a stripe which has an area smaller than the display area, said stripe being parallel to the plurality of rows;
   (c) using a moving optical element to cause the stripe of illumination light to scan over the display area in a direction perpendicular to the plurality of rows, said direction corresponding to the direction in which the plurality of rows tire sequentially addressed during the frame refresh cycle; and
   (d) synchronizing the scanning of the stripe of illumination light with the frame refresh cycle so tat for each row of the display, the majority of the illumination light which impinges on the row as a result of the scan is in the last half of a refresh period for the row.

2. The method of claim 1 wherein the majority of the illumination light which impinges on the row as a result of the scan is in the last third of a refresh period for the row.

3. The method of claim 1 wherein the ratio of the area of the stripe to the display area is less than or equal to one third.

4. A method for illuminating a display panel which has a display area and comprises a plurality of rows which are sequentially addressed during a frame refresh cycle, said frame refresh cycle having a period T and each of the plurality of rows having a predetermined refresh time within a frame refresh cycle with the period of time between successive refresh times for each row being the cycle refresh period for the row and being equal to T, said method comprising:
   (a) providing illumination light from a light source;
   (b) compressing the illumination light into a stripe which has an area smaller than the display area, said stripe being parallel to the plurality of rows;
   (c) sequentially scanning the stripe of illumination light over each of the plurality of rows during the frame refresh cycle; and
   (d) synchronizing the scanning of the stripe of illumination light with the frame refresh cycle so that for each row of the display, the majority of the illumination light which impinges on that row as a result of the scan is in the last half of the cycle refresh period for that row.

5. The method of claim 4, wherein sequentially scanning the stripe of illumination light comprises using a moving optical element to cause the stripe of illumination light to sequentially scan the stripe over each of the plurality of rows.

6. The method of claim 5, wherein the moving optical element comprises a moving lens.

7. The method of claim 5, wherein the moving optical element comprises a rotating prism.

8. The method of claim 4, wherein synchronizing the scanning of the stripe of illumination light comprises synchronizing the scanning of the stripe of illumination light with the frame refresh cycle so that for each row of the display, the majority of the illumination light which impinges on that row as a result of the scan is in the last third of the cycle refresh period for that row.

9. The method of claim 4, wherein compressing the illumination light into a stripe comprises compressing the illumination light into a stripe which has an area that is one third or less of the display area.

10. The method of claim 4, wherein compressing the illumination light into a stripe comprises compressing the illumination light into a stripe using the moving optical element.

11. The method of claim 4, wherein the display panel comprises a liquid crystal display panel.

12. A display comprising:
   an illumination system comprising
   a light source, and
   a movable optical element,
   wherein the illumination system is capable of compressing light from the light source into a stripe of illumination light that has an area smaller than the display area;
   a display panel comprising a display area and a plurality of rows; and
   a processor configured and arranged to sequentially address each of the plurality of rows of the display panel during a frame refresh cycle to display an image, wherein the frame refresh cycle has a period T and each of the plurality of rows has a predetermined refresh time within the frame refresh cycle with the period of time between successive refresh times for each row being the cycle refresh period for the row and being equal to T, the processor being further configured and arranged to move the optical element to scan the stripe of illumination light sequentially over each of the plurality of rows in a synchronized manner so that the majority of the illumination light impinges on each row during the last half of a cycle refresh period for that row.

13. The display of claim 12, wherein the movable optical element comprises a movable lens.

14. The display of claim 12, wherein the movable optical element comprises a rotatable prism.

15. The display of claim 12, wherein the processor is configured and arranged to move the optical element to scan the stripe of illumination light sequentially over each of the plurality of rows in a synchronized manna so that the majority of the illumination light impinges on each row during the last third of the cycle refresh period for that row.

16. The display of claim 12, wherein the movable optical element is capable of compressing light from the light source into a stripe of illumination light tat has an area that is one third or less of the display area.

17. The display of claim 12, further comprising a projection lens that receives light from the display panel.

18. The display of claim 12, wherein the display panel comprises a liquid crystal display panel.

19. The display of claim 12, wherein the movable optical element is capable of compressing light from the light source into a stripe of illumination light that has an area smaller than the display area.

* * * * *

UNITED STATES PATENT AND TRADEMARK OFFICE
CERTIFICATE OF CORRECTION

| | | |
|---|---|---|
| PATENT NO. | : 7,196,687 B2 | Page 1 of 1 |
| APPLICATION NO. | : 10/699957 | |
| DATED | : March 27, 2007 | |
| INVENTOR(S) | : Arlie R. Conner | |

It is certified that error appears in the above-identified patent and that said Letters Patent is hereby corrected as shown below:

Page 2,
Column 2 under other publications, Line 3, delete "p" and insert -- P -- therefor.

Column 5,
Line 42, delete "tire" and insert -- are -- therefor.
Line 45, delete "tat" and insert -- that --, therefor.
Line 60, delete "the" and insert -- a --, therefor.

Column 6,
Line 54, delete "clement" and insert -- element --, therefor.
Line 67, delete "manna" and insert -- manner --, therefor.

Column 7,
Line 5, delete "tat" and insert -- that --, therefor.

Signed and Sealed this

Thirty-first Day of July, 2007

JON W. DUDAS
*Director of the United States Patent and Trademark Office*